United States Patent [19]

Byrne

[11] Patent Number: 4,540,986
[45] Date of Patent: Sep. 10, 1985

[54] VIDEO PROCESSOR FOR AIR TRAFFIC CONTROL BEACON SYSTEM

[75] Inventor: Frank Byrne, Cocoa Beach, Fla.

[73] Assignee: The United States of America as represented by the United States National Aeronautics and Space Administration, Washington, D.C.

[21] Appl. No.: 425,201

[22] Filed: Sep. 28, 1982

[51] Int. Cl.³ .............................................. G01S 13/80
[52] U.S. Cl. .................................................. 343/6.8 R
[58] Field of Search ........................ 343/6.8 R, 6.8 LC

[56] References Cited

U.S. PATENT DOCUMENTS

| | | | |
|---|---|---|---|
| 3,176,291 | 3/1965 | Majerus et al. | 343/6.8 LC |
| 3,178,706 | 4/1965 | Clock | 343/6.8 LC |
| 3,259,897 | 7/1966 | Strathman | 343/6.8 LC |

Primary Examiner—T. H. Tubbesing
Attorney, Agent, or Firm—James O. Harrell; John R. Manning; Robert D. Marchant

[57] ABSTRACT

A circuit for use in a transponder located in an aircraft or the like for identifying a true side lobe suppression signal being transmitted by a ground located transmitted system. The true side lobe suppression signal includes at least pulses P1 and P2. The circuit causes the transponder to produce a reply signal upon the amplitude of the P1 pulse being a predetermined ratio to said P2 pulse. The circuit includes a pair of transistors with a capacitor connected to the output of the second transistor. The pulses P1 and $P_2$ are supplied to the base electrode of the first transistor. Pulse P1 turns on the two transistors and charges the capacitor to a predetermined level so that when the second pulse P2 arrives, it does not turn on a transistor when it is equal to or less than the first pulse P1.

3 Claims, 3 Drawing Figures

VIDEO PROCESSOR FOR AIR TRAFFIC CONTROL BEACON SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Air traffic control transponders are used in airplanes to respond to interrogations from air traffic control ground radar stations. The air traffic control radar transponder located in the airplane senses interrogation signals being transmitted from the ground and if the signal is a proper signal returns a response signal back to the ground. In order to minimize the amount of clutter on the radar oscilloscope that the ground operator watches, a system has been instituted known as side-lobe suppression for the air traffic control radar system. Basically, what this means is that the transponder on the aircraft only replies to the main lobe of the radar antenna pointing towards the airplane and not to any other extraneous radiations from the ground. Therefore, special circuitry has been incorporated in transponders which are referred to as side-lobe suppression circuits.

In order to accomplish side-lobe suppression, the ground radar transmits a special side-lobe suppression pulse along with other pulses to the aircraft during usual interrogation. The side-lobe suppression pulse is generally referred to as pulse P2 in the pulse train. The pulse train normally includes pulses P1, P2, and P3. Pulses P1 and P3 are transmitted by a directional antenna and the side-lobe suppression pulse P2 is transmitted by an omni-directional antenna located on the ground.

As previously mentioned, transponders now being used on aircraft have circuits provided therein recognizing the pulse P2 that is sandwiched between the pulses P1 and P3. When the pulse P2 is a certain amplitude compared to pulse P1, such causes circuitry associated with the transponder to be triggered indicating a true interrogation. However, if the side-lobe suppression pulse P2 is equal to or greater than pulse P1, then the transponder will not reply. When P1 is at least 9 db. greater than P2, the transponder must reply. So there is a region of 9 db. in between what is called a "threshold" decision region. In order to recognize the differences in amplitude between pulses P1 and P2, the transponders must be equipped with circuitry to make such distinction. There have been quite a few attempts at making this comparison, however, they normally incorporate complicated and expensive circuits. Attempts have been made to construct less expensive circuits, however, normally these circuits have difficulty differentiating over a very large dynamic range or a very large signal range accurately.

SUMMARY OF THE INVENTION

The circuit constructed in accordance with the present invention is designed for use in transponders for recognizing in a simple and inexpensive manner the differences between the P1 and P2 signals that are normally transmitted from ground stations to transponders located in an aircraft. The circuit includes an antenna for receiving the pulse chain which includes the side lobe suppression pulse P2 sandwiched between pulses P1 and P3. These signals are standardized signals as described in more detail in U.S. Pat. No. 4,075,631. A chain of pulses received by the antenna are amplified and fed to the base electrode of a first transistor. The first pulse P1 turns on the first transistor causing a second transistor which is connected by its base electrode to the collector electrode of the first transistor to turn on. When the second transistor turns on, a DC voltage is used for charging a capacitor through the second transistor to the approximate value of pulse P1 that was initially applied to the base electrode of the first transistor. When the second pulse P2 of the chain is received by the base electrode of the first transistor, it does not activate the first transistor if the charge on the capacitor is the same or greater than the amplitude of pulse P2. As a result, the second transistor is not turned on and there is no output signal produced. If, however, the second pulse P2 that is applied to the base electrode of the first transistor is equal to or greater than the charge on the capacitor, then the second transistor will then again be turned on, producing an output signal. The output signal is fed to a logic circuit which recognizes when there is a pulse/no-pulse relation indicating that there is a true side lobe signal. If, however, as previously mentioned, the P2 pulse of the chain turns on the first transistor, then there would be produced two successive output pulses on the output terminal which would indicate that it is not a true side lobe suppression signal.

Accordingly, it is an important object of the present invention to provide a circuit for recognizing the ratio between the pulses P1 and P2 that are transmitted from a conventional ground station to a transponder located in an aircraft.

Another important object of the present invention is to provide a simple and inexpensive circuit for providing well-defined thresholds between the P2 and P1 signals being transmitted from ground stations to transponders located in an aircraft or the like.

DESCRIPTION

Figure 1:
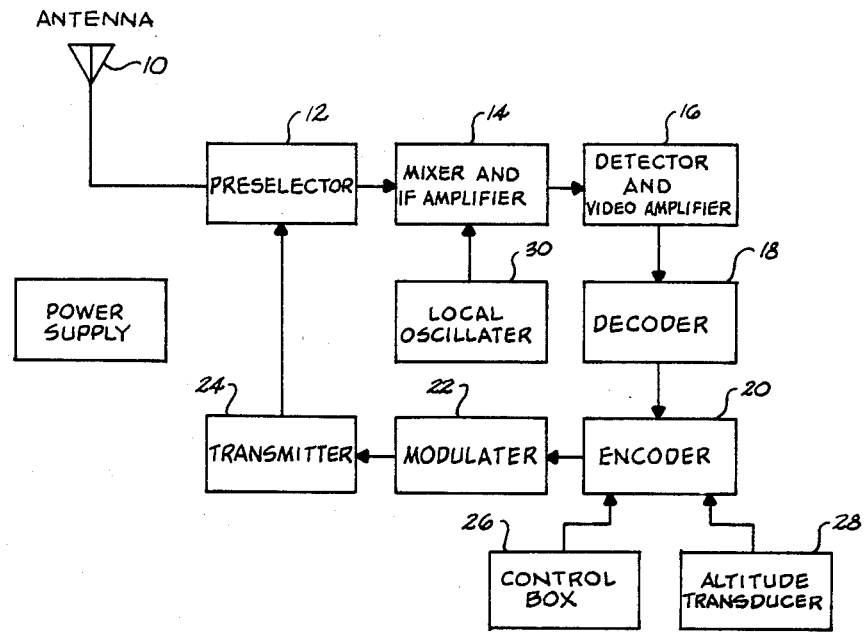
FIG. 1 is a block diagram illustrating a conventional transponder circuit.
Figure 2:
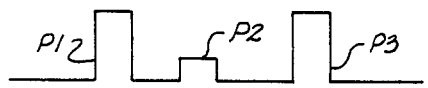
FIG. 2 is a pulse diagram showing the typical pulses, P1, P2, P3 of an interrogation signal used with conventional transponders.
Figure 3:
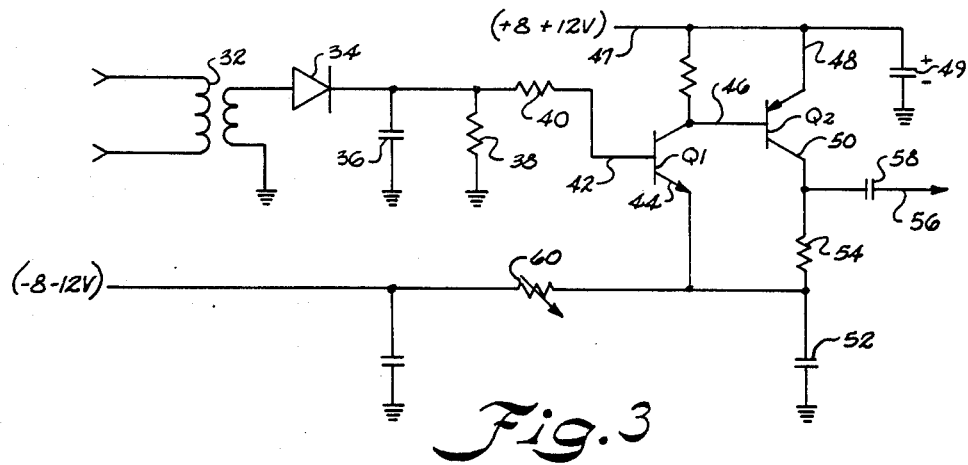
FIG. 3 is a schematic diagram illustrating a circuit for distinguishing between the pulses of a side lobe suppression signal.

Referring in more detail to FIG. 1 of the drawing, there is illustrated a conventional antenna 10 which receives an interrogation signal being transmitted from ground to a transponder located within an aircraft. The interrogation signal includes pulses P1, P2, and P3 such as shown in FIG. 2. This interrogation signal is subsequently passed through a preselector 12 where a primary preselection is formed to eliminate spurious responses. The received signal is subsequently heterodyned in a mixer 14 and amplified in a standard IF amplifier. The IF signal is passed on to a detector and video amplifier 16 which is provided for recognizing when there is a true interrogation signal including at least the pulses P1 and P2 in the desired amplitude ratio. The output of the detector and video amplifier is subsequently passed to a digital decoder 18. The digital decoder 18 makes a decision depending on the interrogation signal received as to whether or not a response should be transmitted. This is accomplished by sending a signal to an encoder 20. The encoder 20 generates a reply digital signal which is fed to a modulator 22 that, in turn, modulates a transmitter 24. The transmitter 24 generates a return response which is mixed in preselector 12 and re-radiated through antenna 10 back to ground. A control box 26 which is generally located on the front panel of a transponder or located at a pilot's control station is used to enter a reply code. The encoder 20 also receives signals from an altitude transducer 28. Normally, signals are automatically transmitted along with a reply code to indicate the altitude of the aircraft. These signals are reported in digtial form. The local oscillator 30 provides the mixing signal for hedrodyning the incoming signal from antenna 10 through the IF signal in mixer 14. A more detailed disclosure of the components forming part of the subject invention and the detector and video amplifier 16 is shown in FIG. 3 of the drawing.

The received signal from the ground is heterodyned to an IF frequency, amplified and subsequently coupled to the video detector 16 through an IF transformer 32. The IF transformer 32 impendence transforms the IF signal to a suitable impedence for driving diode 34 of the video detector. The video detector which includes diode 34, capacitor 36 and resistor 38 generates a positive pulse for all received incoming pulses from the ground. Positive pulse outputs of diode 34 are supplied through a resistor 40 to the base electrode 42 of a first transistor Q1 causing transistor Q1 to conduct. Transistor Q1 is an NPN transistor. Transistor Q1 operates as a differential amplifier and when the voltage on the base electrode is greater than the voltage applied to the emitter electrode, transistor Q1 is turned on. When transistor Q1 is turned on, a signal is applied to the base electrode 46 of transistor Q2 turning on Q2. When transistor Q2 is turned on, a positive voltage from a positive power supply 47 is fed through the emitter electrode 48 of transistor Q2 and out the collector electrode 50 charging capacitor 52 through resistor 54. It also causes an output signal to be fed to output terminal 56 through a coupling capacitor 58.

As previously mentioned, the output terminal 56 feeds the signals received thereon to a decoder 18 for decoding the pulses.

When the charge on capacitor 52 is equal to the pulse amplitude of the pulse applied to the base electrode 42 of transistor Q1, the charging of capacitor 52 ceases at a point where it is equal to the peak of the pulse that was applied to the base electrode of transistor Q1.

While the charging of capacitor 52 is occurring as previously mentioned, there is an output signal produced on output terminal 56 which is equal to the duration of the pulse applied to the base of transistor Q1. The transistors Q1 and Q2 operate as a difference amplifier pair and basically amplify the pulses only if there is a difference between the charge on capacitor 52 and the amplitude of the pulse that is applied to the base of transistor Q1. If the amplitude of the pulse applied to the base of transistor Q1 is equal to or less than the charge on capacitor 52, no output results from transistor Q2 to the decoder 18 and the pulse is suppressed. If the amplitude is greater than the charge on capacitor 52, an output results and capacitor 52 is charged to the new value. Resistor 60 and capacitor 52 form a discharge time constant that is adjusted to discharge capacitor 52 in approximately 15 microseconds which is the maximum time period of a radar transponder received pulse pair. In other words, the capacitor 52 does not stay charged sufficiently to interfere with the next cycle of pulses being received.

The side-lobe suppression circuit works as follows: When pulse P2 as shown in FIG. 2 is equal to or less than the amplitude of pulse P1, the pulse amplitude of P2 as seen by the base electrode of transistor Q1 is insufficient to trigger transistors Q1 and Q2 into conduction and, therefore, will not cause an output to be produced on output terminal 56. When pulse P2 is greater than pulse P1, meaning its side-lobe signal has been received from the ground, then pulse P2 causes an output on lead 56 because transistors Q1 and Q2 conduct momentarily as capacitor 52 charges to the new value greater than the value it charged during the time interval that pulse P1 is applied. This causes the decoder 18 to recognize that a side lobe has been received and causes it to suppress the reply.

SUMMARY

In summary, the circuitry is designed to detect whether the pulse amplitude of pulse P2 is greater or less than the pulse amplitude of pulse P1 indicating whether or not a side lobe has been received from the ground radar transmitting antenna. When pulse P2 is greater than pulse P1, a side lobe has been received. When pulse P2 is less than P1, a side lobe has not been received and the circuit of FIG. 3 differentiates between these two amplitude extremes. When there is a true interrogation signal such as shown in FIG. 2 of the drawing, the first pulse P1 causes transistor Q1 to be triggered which, in turn, causes transistor Q2 to be turned on, charging capacitor 52 to the peak value of pulse P1. Then the pulse P2 will be received. Since it has an amplitude less than that of pulse P1, transistors Q1 and Q2 will not conduct and there will be no output on the output terminal 56. Accordingly, the decoder will sense the interrogation signal of pulse/no pulse appearing on output terminal 56 indicating that a reply is required.

While a preferred embodiment of the invention has been described using specific terms, such description is for illustrative purposes only, and it is to be understood that changes and variations may be made without departing from the spirit or scope of the following claims.

What is claimed is:

1. A circuit for use in a transponder located in an aircraft or the like for identifying a true side lobe suppression signal being transmitted by a ground located transmitter system, said true side lobe suppression signal includes at least pulses P1 and P2, said circuit causing said transponder to produce a reply signal upon the amplitude of said P1 pulse being a predetermined ratio to said P2 pulse, said circuit comprising:
   (a) an antenna receiving said side lobe suppression signal;
   (b) means for amplifying said side lobe suppression signal;
   (c) a first transistor having base, emitter and collector electrodes;
   (d) a second transistor having a base, emitter and collector electrodes;
   (e) a D.C. power supply connected to at least one of said electrodes of said transistors;

(f) means for connecting said collector electrode of said first transistor to said base electrode of said second transistor;
(g) a capacitor connected to said collector electrode of said second transistor and said emitter electrode of said first transistor;
(h) an output terminal connected to said collector electrode of said second transistor;
(i) circuit means for supplying pulse P1 received by said antenna to said base electrode of said first transistor causing said first transistor to turn on which causes said second transistor to turn on charging said capacitor to approximately the same value as pulse P1 and producing a signal on said output terminal;
(j) said circuit means supplying a pulse P2 received by said antenna to said base electrode of said first transistor for being compared with the charge on said capacitor whereby when the amplitude of pulse P2 applied to the base of said first transistor is equal to or less than the charge on said capacitor, no output signal is produced on said output terminal.

2. The circuit as set forth in claim 1 further comprising:
(a) a variable resistor means being connected to said emitter electrode of said first transistor;
(b) means for connecting a negative potential to said variable resistor means on a side opposite from said first transistor; and
(c) said variable resistor means controlling the discharge rate of said capacitor.

3. The circuit as set forth in claim 1 wherein:
(a) said D.C. power supply is a positive voltage source which is connected to the emitter electrode of said second transistor; and
(b) said capacitor is connected between said collector electrode of said second transistor and ground.

* * * * *